(12) United States Patent
Chen et al.

(10) Patent No.: US 9,408,164 B2
(45) Date of Patent: Aug. 2, 2016

(54) MULTIPLEXING TRANSMISSION METHOD FOR MILLIMETER-WAVE COMMUNICATION SPACE, AND MILLIMETER-WAVE COMMUNICATION DEVICE

(71) Applicant: ZTE CORPORATION, Shenzhen, Guangdong Province (CN)

(72) Inventors: Lin Chen, Shenzhen (CN); Zhou Zhi, Shenzhen (CN); Qian Wang, Shenzhen (CN); Zhong Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/893,940

(22) PCT Filed: Aug. 16, 2013

(86) PCT No.: PCT/CN2013/081655
§ 371 (c)(1),
(2) Date: Dec. 29, 2015

(87) PCT Pub. No.: WO2013/189347
PCT Pub. Date: Dec. 27, 2013

(65) Prior Publication Data
US 2016/0112970 A1    Apr. 21, 2016

(30) Foreign Application Priority Data
May 27, 2013    (CN) .......................... 2013 1 0201714

(51) Int. Cl.
*H04B 7/00* (2006.01)
*H04W 52/38* (2009.01)
*H04B 7/06* (2006.01)

(52) U.S. Cl.
CPC ............. *H04W 52/38* (2013.01); *H04B 7/0617* (2013.01)

(58) Field of Classification Search
None
See application file for complete search history.

(56) References Cited

U.S. PATENT DOCUMENTS

| 9,300,021 B2 * | 3/2016 | Yang .................... H01P 1/20372 |
| 2008/0207200 A1 * | 8/2008 | Fein ......................... H04B 1/38 455/426.1 |
| 2009/0166249 A1 * | 7/2009 | Wang .................... H01L 23/552 206/719 |

(Continued)

FOREIGN PATENT DOCUMENTS

| CN | 101137221 A | 3/2008 |
| CN | 102483452 A | 5/2012 |
| CN | 102545972 A | 7/2012 |

*Primary Examiner* — Dominic Rego
(74) *Attorney, Agent, or Firm* — Ling Wu; Stephen Yang; Ling and Yang Intellectual Property (57) ABSTRACT

Disclosed is a millimeter-wave communication spatial multiplexing transmission method, and the method includes: a millimeter-wave communication device initiating high-speed data communication with a target device, sending a beam-forming request to the target device via a low frequency band communication module, if the millimeter-wave communication device has received an acknowledgement response sent by the target device via the low-frequency band communication module and learns that a non-target device is performing the high-speed data communication in a same frequency band with the high-speed data communication initiated by the millimeter-wave communication device, the millimeter-wave communication device configuring transmitting power which is less than default power to perform beam scanning.

12 Claims, 4 Drawing Sheets

(56) References Cited

U.S. PATENT DOCUMENTS

| | | | |
|---|---|---|---|
| 2010/0297990 A1* | 11/2010 | Le Pezennec | H04W 88/08 455/422.1 |
| 2011/0051780 A1* | 3/2011 | Kawasaki | H04B 1/40 375/135 |
| 2011/0064033 A1* | 3/2011 | Gong | H04B 7/0617 370/329 |
| 2011/0080898 A1* | 4/2011 | Cordeiro | H04B 7/0617 370/338 |
| 2011/0149842 A1* | 6/2011 | Cordeiro | H04B 7/0491 370/328 |
| 2011/0199918 A1 | 8/2011 | Sampath et al. | |
| 2012/0135677 A1* | 5/2012 | Hsu | H04B 7/15507 455/11.1 |
| 2012/0183091 A1* | 7/2012 | Komori | H03K 7/02 375/272 |
| 2012/0195348 A1* | 8/2012 | Uno | H04B 1/7073 375/146 |
| 2012/0243638 A1* | 9/2012 | Maltsev | H04B 7/2126 375/316 |
| 2012/0320874 A1* | 12/2012 | Li | H04W 48/12 370/331 |
| 2013/0223251 A1* | 8/2013 | Li | H04W 72/046 370/252 |
| 2014/0148107 A1* | 5/2014 | Maltsev | H04B 1/02 455/91 |

* cited by examiner

MULTIPLEXING TRANSMISSION METHOD FOR MILLIMETER-WAVE COMMUNICATION SPACE, AND MILLIMETER-WAVE COMMUNICATION DEVICE

TECHNICAL FIELD

The present document relates to the wireless communication technologies, and more particularly, to a millimeter-wave communication spatial multiplexing transmission method and a millimeter-wave communication device.

BACKGROUND OF THE RELATED ART

Millimeter-wave communication technology refers to a technology using an electromagnetic wave whose wavelength is one centimeter to one millimeter (corresponding to the frequency range of 30 GHz to 300 GHz) to communicate. Currently, civil millimeter-wave communication technology mainly uses the spectrum whose frequency band is about 60 GHz, which is mainly derived from the following factors: firstly, many countries and regions plan to use the spectrum close to the 60 GHz as permission-free frequency band, which has the biggest advantage of free use; secondly, in the most recent period, as the technology becomes more and more mature, the performance and power consumption index of the 60 GHz millimeter-wave device have been enhanced greatly and have basically met the practical needs; thirdly, the 60 GHz wireless communication technology gradually develops from academic theory research to practical application research in industry, currently there already are several international standard organizations completed or mostly completed the 60 GHz international standards, such as IEEE 802.11ad and IEEE 802.15.3c as well as European ECMA-387, with the active promotion of various chip manufacturers and communication companies. The IEC also released the International Standard 13156 based on the first release of ECMA-387 specification.

The biggest advantage of 60 GHz technology is very wide transmission bandwidth and in the vicinity of 60 GHz, can provide up to 5 GHz transmission bandwidth, has a transmission rate of up to 1 Gps, and is that the occupied working frequency can be used without authorization. Because the electromagnetic spectrum is a strong absorption peak close to the 60 GHz, the electromagnetic wave propagation decay in this frequency range is very large, therefore the typical transmission distance of the 60 GHz communication technology is no more than 10 meters. This electromagnetic propagation property not only defines that the application scenario of the 60 GHz communication technology is primarily the indoor environment, but also makes the spatial multiplexing become possible.

The 60 GHz technology still has some technical difficulties, mainly originated from the 60 GHz electromagnetic wave propagation characteristics and the spatial channel characteristics determined thereby. For example: in the 60 GHz frequency band, the electromagnetic wave propagation is behaved more similar to light propagation, i.e., the 60 GHz antenna is primarily a directional antenna, using such an antenna cannot find the target device if the target device does not fall within the pointing range of the current device antenna pattern, thus generating the so-called "shadow phenomenon". To solve this problem, in addition to adjusting the antenna directivity, it also designs the MAC layer specifically for the directional antenna, which will affect the efficiency of the MAC layer and reduce the valid data transmission to some extent.

Figure 1:
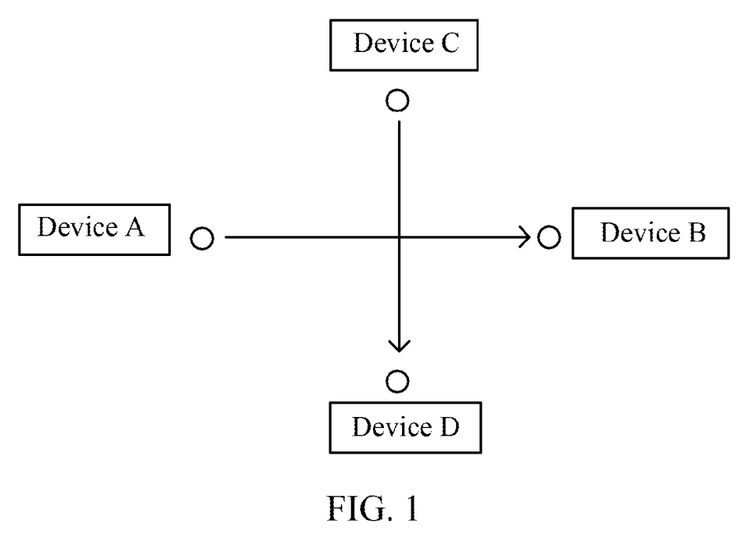
FIG. 1 is a schematic diagram of spatial multiplexing transmission of a 60 GHz millimeter-wave communication device.

The 60 GHz antenna may have features of narrow beam and directivity through the beamforming technology, so that in theory, the 60 GHz millimeter-wave communication technology can take advantage of three-dimensional space to perform transmission multiplexing so as to greatly increase the system capacity, and as shown in FIG. 1. But on the other hand, due to the features of the directional antenna and the presence of phenomena such as shadow and occlusion, the spatial multiplexing transmission is relatively difficult to implement, especially in the beamforming phase, which will cause relatively large interference. The beamforming can be roughly divided into two phases, the first phase: using the quasi-omnidirectional antenna to perform beam scanning, the second phase: after obtaining the general direction of transmission object after completing the beam scanning phase, performing a beam refinement. Wherein the first phase is mandatory, and the second phase is optional, but taking into account that the beam direction obtained in the first phase is relatively broad, the transmitting end and receiving end cannot be precisely aligned, therefore the second phase is generally required.

Figure 2:
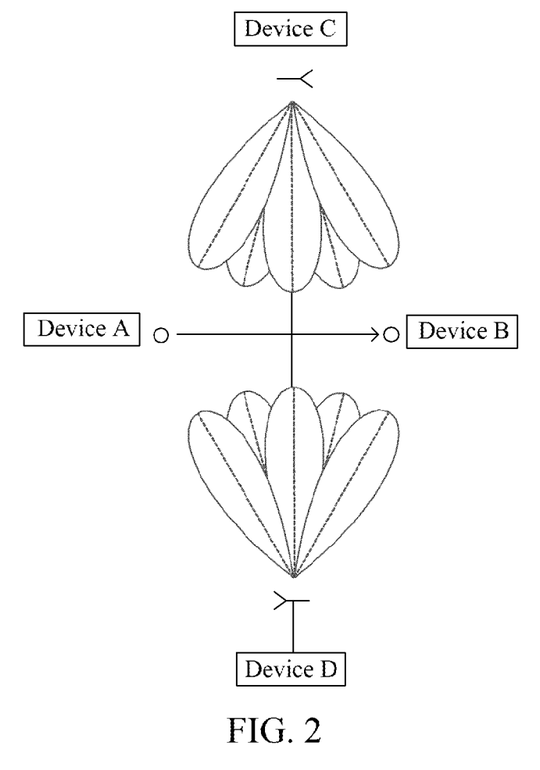
FIG. 2 is a schematic diagram of beam scanning interfering with existing communication links.

As shown in FIG. 2, if the device C and the device D need to perform a high-speed communication, they need to perform a beamforming operation. However, when the devices A and B are already in the high-speed communication state, the beam scanning operation desired by the beamforming conducted by the devices C and D may interfere with the current communication states of the devices A and B. Although the devices C and D can also choose other channels (channels other than the channels occupied by the links of the devices A and B) for transmission, such an operation is actually the spatial multiplexing concept that uses different frequencies instead of the same frequency for transmission.

In summary, currently, in the 60 GHz millimeter-wave communication, the spatial multiplexing transmission cannot be implemented without affecting the existing links.

SUMMARY

The technical problem to be solved by the present document is to provide a millimeter-wave communication spatial multiplexing transmission method and a millimeter-wave communication device to perform beamforming and further establish a high-speed data transmission link on the basis of not affecting the existing links, thus achieving the spatial multiplexing transmission in real sense.

To solve the abovementioned technical problem, the present document provides a millimeter-wave communication spatial multiplexing transmission method, wherein the method comprises:

a millimeter-wave communication device initiating high-speed data communication with a target device, sending a beamforming request to the target device via a low-frequency band communication module, and if the millimeter-wave communication device has received an acknowledgment response sent by the target device via the low-frequency band communication module and learns that there is a non-target device performing high-speed data communication in a same frequency band with the high-speed data communication initiated by the millimeter-wave communication device, the millimeter-wave communication device configuring transmitting power which is less than default power to perform beam scanning.

Preferably, the method further comprises:

in a process of the millimeter-wave communication device performing the beam scanning, if the millimeter-wave communication device learns that the beam scanning interferes with the high-speed data communication which is being performed by the non-target device in the same frequency band within a beam scanning range via the low-frequency band communication module, the millimeter-wave communication device reducing current transmitting power to perform the beam scanning.

Preferably, the method further comprises:

after reducing the current transmitting power, the millimeter-wave communication device also judging whether the reduced transmitting power is less than minimum transmitting power, and if the reduced transmitting power is less than the minimum transmitting power, pausing for a predetermined time period, and after the pause is finished, using the minimum transmitting power to perform the beam scanning; otherwise, using the reduced transmitting power to perform the beam scanning.

Preferably, after the millimeter-wave communication device sends the beamforming request to the target device via the low-frequency band communication module, if the non-target device has received the beamforming request, and is performing the high-speed data communication in the same frequency band with the high-speed data communication initiated by the millimeter-wave communication device, the non-target device sends a first alarm message to the millimeter-wave communication module via the low-frequency band communication module, and informs the millimeter-wave communication device that there is a non-target device performing the high-speed data communication in the same frequency band within the beam scanning range;

the millimeter-wave communication device learning that there is a non-target device to perform the high-speed data communication in a same frequency band with the high-speed data communication initiated by the millimeter-wave communication device, comprises: after receiving the first alarm message via the low-frequency band communication module, the millimeter-wave communication device learning that there is a non-target device performing the high-speed data communication in the same frequency band with the high-speed data communication initiated by the millimeter-wave communication device.

Preferably, in the process of the millimeter-wave communication device performing the beam scanning, if the non-target device that is performing the high-speed data communication in the same frequency band within the beam scanning range detects that power of a received interference signal is higher than a predetermined power threshold value, the non-target device sends a second alarm message to the millimeter-wave communication device via the low-frequency band communication module;

the millimeter-wave communication device learning that the beam scanning interferes with the high-speed data communication which is being performed by the non-target device in the same frequency band within a beam scanning range via the low-frequency band communication module, comprises: after receiving the second alarm message via the low frequency band communicate module, the millimeter wave communication device learning that the beam scanning interferes with the high-speed data communication which is being performed by the non-target device in the same frequency band within the beam scanning range.

Preferably, the low-frequency band communication module is a Wireless Fidelity (Wi-Fi) module, and the high-speed data communication initiated by the target device is 60 GHz high-speed data communication.

Preferably, a millimeter-wave communication device, comprises, a low-frequency band communication module, a millimeter-wave communication module and a control module, wherein:

the control module is configured to, initiate high-speed data communication with a target device, send a beamforming request to the target device via the low-frequency band communication module, and if an acknowledgement response sent by the target device has been received via the low-frequency band communication module and that there is a non-target device performing high-speed data communication in a same frequency band with the high-speed data communication initiated by the millimeter-wave communication device is learned, configure transmitting power which is less than a default power to perform beam scanning via the millimeter-wave communication module.

Preferably, the control module is further configured to, in a process of performing beam scanning, if that the beam scanning interferes with the high-speed data communication which is being performed by the non-target device in the same frequency band within the beam scanning range via the low-frequency band communication module is learned, reduce current transmitting power to perform the beam scanning.

Preferably, the control module is further configured to, after reducing the current transmitting power, judge whether the reduced transmitting power is less than minimum transmitting power, and if the reduced transmitting power is less than the minimum transmitting power, pause for a predetermined time period, and after the pause is finished, use the minimum transmitting power to perform the beam scanning; otherwise, use the reduced transmitting power to perform the beam scanning.

Preferably, the control module is configured to, after receiving a first alarm message via the low-frequency band communication module, learn that there is a non-target device performing the high-speed data communication in the same frequency band with the high-speed data communication initiated by the millimeter-wave communication device, wherein, the first alarm message is sent via the low-frequency band communication module when the non-target device has received the beamforming request and if the high-speed data communication in the same frequency band with the high-speed data communication initiated by the millimeter-wave communication device is being performed.

Preferably, the control module is configured to, after receiving a second alarm message via the low frequency band communicate module, learn that the beam scanning interferes with the high-speed data communication which is being performed by the non-target device in the same frequency band within the beam scanning range, wherein the second alarm message is sent via the low-frequency band communication module in the process of performing the beam scanning when the non-target device that is performing the high-speed data communication in the same frequency band within the beam scanning range detects that power of a received interference signal is higher than a predetermined power threshold value.

Preferably, the low-frequency band communication module is a Wireless Fidelity (Wi-Fi) module, and the millimeter-wave communication module is a 60 GHz millimeter-wave communication module.

In summary, the embodiments of the present document use a low-frequency band communication module to provide control signaling connection and beam scanning initialization information for the beamforming, and with the support of the low-frequency band communication module, it can easily complete the beamforming and directional transmission, and reduce interference with existing transmission links, thus enabling the spatial multiplexing transmission.

PREFERRED EMBODIMENTS OF THE INVENTION

Given that the low-frequency band Wi-Fi technology has been widely used in the terminal device, and in the 2.4 G/5 G frequency band, the electromagnetic wave does not propagate like light as the 60 GHz, so that the Wi-Fi technology can be complementary effectively with the 60 GHz technique and used in conjunction. Specifically, for the 60 GHz millimeter-wave wireless communication technology, the low-frequency band Wi-Fi module provides control signaling transmission service for the 60 GHz module, and assists the 60 GHz module to complete the information required for the beamforming, while reducing the power level required by the 60 GHz beam to perform the beam scanning, thus maximally reducing the interference with existing data transmission links.

Hereinafter, in conjunction with the accompanying drawings, the embodiments of the present document will be described in detail. It should be noted that, in the case of no conflict, embodiments and features in the embodiments in the present application can be combined with each other.

In the following, it is the process of two devices establishing beamforming to perform spatial multiplexing communication via a low-frequency band Wi-Fi module in the case that there exists a 60 GHz millimeter-wave communication link in the vicinity.

Figure 3:
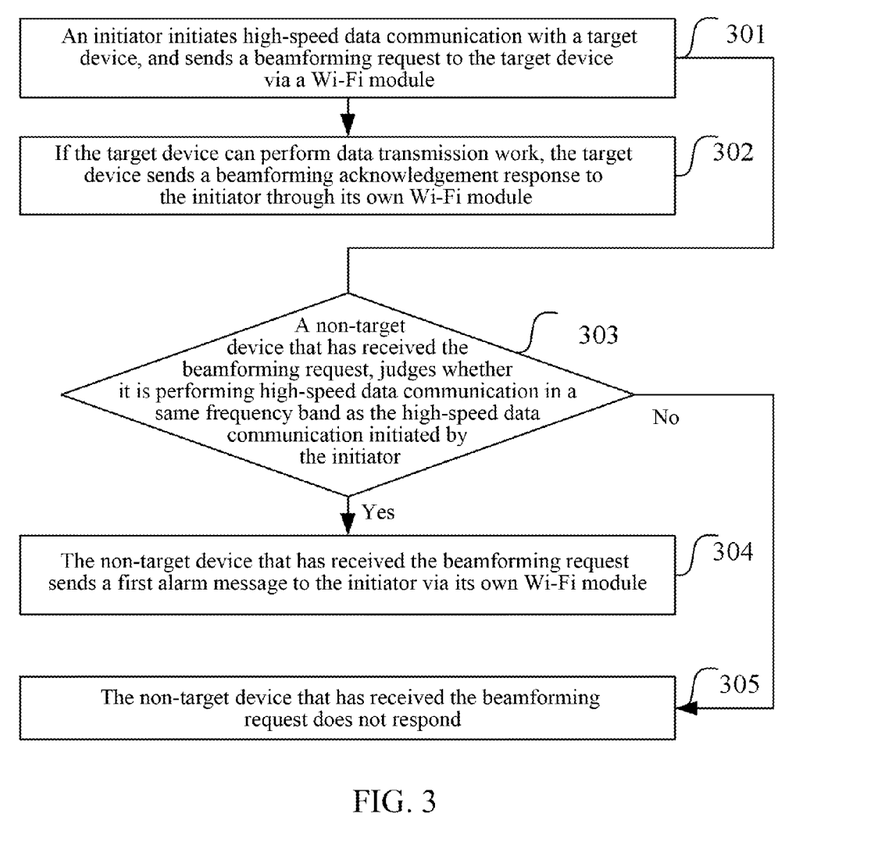
FIG. 3 is a flow chart of a beam scanning preparation phase of beamforming in accordance with a method in the embodiment of the present document.

As shown in FIG. 3, the beam scanning preparation phase of the beamforming in the millimeter-wave communication spatial multiplexing transmission method in accordance with the present embodiment comprises the following steps:

In step 301, the millimeter-wave communication device (beamforming initiator, hereinafter referred to as an initiator) initiates high-speed data communication with the target device, and sends a beamforming request to the target device via the low-frequency band communication module (e.g., Wi-Fi module);

In step 302, if the target device (responder) can perform the data transmission work, the target device sends a beamforming acknowledgement response to the initiator through its own Wi-Fi module;

In step 303, the non-target device that has received the beamforming request judges whether it is performing high-speed data communication in the same frequency band with the high-speed data communication initiated by the initiator (using the 60 GHz module to perform the high-speed data communication), and if yes, it is to proceed to step 304; otherwise, it is to proceed to step 305;

In step 304, the non-target device that has received the beamforming request sends a first alarm message to the initiator through its own Wi-Fi module, and indicates that there is a non-target device performing the high-speed data communication in the same frequency band with the high-speed data communication initiated by the initiator within the beam scanning range to the initiator;

In step 305, the non-target device that has received the beamforming request does not respond.

Figure 4:
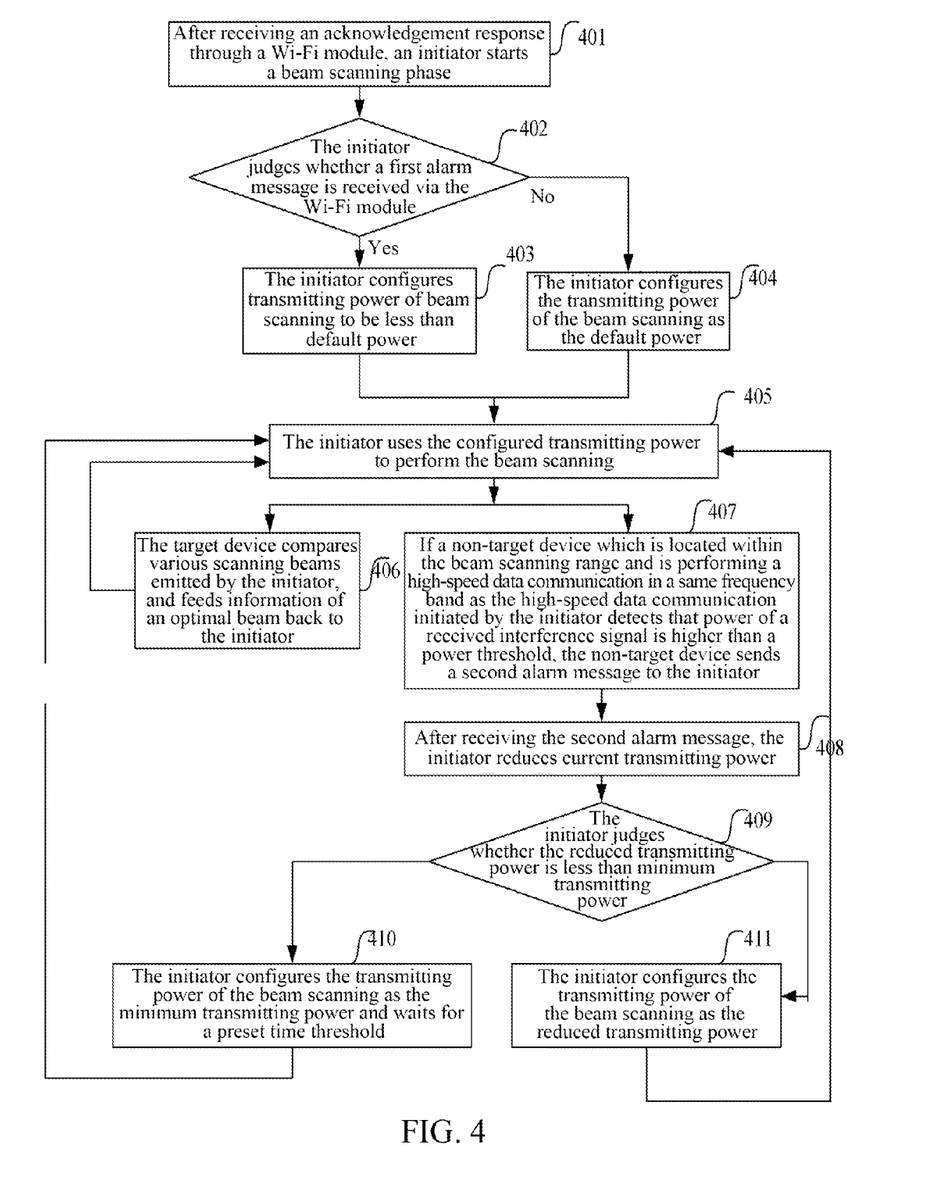
FIG. 4 is a flow chart of a beam scanning phase of the beamforming in accordance with the method in the embodiment of the present document.

As shown in FIG. 4, the beam scanning phase of the beamforming in the millimeter-wave communication spatial multiplexing transmission method in accordance with the present embodiment comprises the following steps:

In step 401, after receiving an acknowledgement response from the target device via the Wi-Fi module, an initiator starts a beam scanning phase;

In step 402, the initiator judges whether a first alarm message is received via the Wi-Fi module or not, and if the first alarm message has been received, it learns that there is a non-target device performing high-speed data communication in the same frequency band with the high-speed data communication initiated by the initiator, and it is to proceed to step 403; otherwise, there is no non-target device performing high-speed data communication in the same frequency band with the high-speed data communication initiated by the initiator, it is to proceed to step 404;

In step 403, the initiator configures the transmitting power of the beam scanning to be less than the default power, it is to proceed to step 405;

the above transmitting power which is less than the default power may be transmitting power which is less than the default power by a fixed value, and the fixed value can be selected according to the actual situation.

In step 404, the initiator configures the transmitting power of the beam scanning as the default power, it is to proceed to step 405;

In step 405, the initiator uses the configured transmitting power to perform the beam scanning;

In step 406, the target device compares the various scanning beams emitted by the initiator and selects an optimal beam, and feeds the information of the optimal beam back to the initiator via the Wi-Fi module;

In step 407, in the process of the initiator performing the beam scanning, if the non-target device which is located within the beam scanning range and is performing high-speed data communication in the same frequency band with the high-speed data communication initiated by the initiator detects that the power of the received interference signal (interference signal received by the 60 GHz module) is higher than the power threshold, that is, the high-speed data communication which is being performed by it has already been interfered, the non-target device sends a second alarm message to the initiator via its own Wi-Fi module;

In step 408, after receiving the second alarm message via the Wi-Fi module, the initiator learns that the beam scanning interferes with the high-speed data communication being performed by the non-target device in the same frequency band with the high-speed data communication initiated by the initiator within the beam scanning range, and reduces the current transmitting power;

The initiator uses the method of reducing a fixed value to reduce the current transmitting power, that is, in beam scanning for one time, if the second alarm message is received, the current transmitting power is reduced by a fixed value, and in the next beam scanning, if the second alarm message is received again, the current transmitting power is further reduced by the fixed value; or, it may also use the method of configuring multiple power ladders, for example, a power ladder with seven levels is configured, and if the second alarm message is received in beam scanning for one time, the transmitting power is adjusted down by one power level, in the next beam scanning, if the second alarm message is received again, then the transmitting power is adjusted down by one power level again.

In step 409, the initiator judges whether the reduced transmitting power is less than the minimum transmitting power, and if yes, it is to proceed to step 410; otherwise, it is to proceed to step 411;

In step 410, the initiator configures the transmitting power of the beam scanning as the minimum transmitting power and waits for a preset time threshold value, at the end of the waiting time, it is to proceed to step 405;

In step 411, the initiator configures the transmitting power of the beam scanning as the reduced transmitting power, it is to proceed to step 405.

Through the abovementioned process, until the completion of the scanning beam, after the initial value of the beam optimization is obtained, the beam optimization process starts.

In accordance with the receiver/transmitter signal flow, the receiver/transmitter in a communication system, from the bottom to the top, can be divided into an antenna, a radio frequency processing unit, a baseband processing unit, wherein the baseband processing unit may be further divided into a physical layer (PHY), a medium access control (MAC) layer, a radio link control (RLC) layer, etc. Wherein the antenna is responsible for receiving/transmitting radio signals, the radio frequency processing unit comprises an analog/digital, digital/analog conversion, demodulation/modulation, filtering, amplification processing for the analog signal, and the like; the main function of the PHY layer is to complete coding/decoding, interleaving/de-interleaving, symbol mapping/demapping, packet packing/unpacking of the baseband signal, and to complete checking the correctness of data received by the physical layer, transmitting an acknowledgment signal or requesting for retransmitting signals; the MAC layer implements logical channel and physical channel mapping, encapsulates the high-layer data into frames and performs error control, physical addressing, and other functions; the RLC layer is responsible for radio link establishment, maintenance, and other functions.

Figure 5:
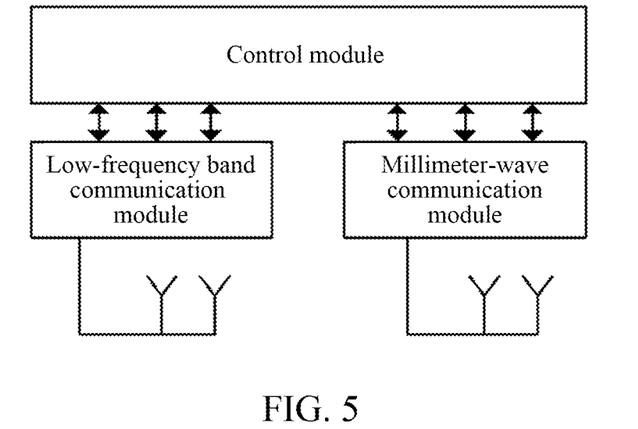
FIG. 5 is an architectural diagram of a millimeter-wave communication device in accordance with the embodiment of the present embodiment.

As shown in FIG. 5, the present embodiment further provides a millimeter-wave communication device, which comprises: a low-frequency band communication module, a millimeter-wave communication module and a control module, wherein:

the control module is configured to initiate high-speed data communication with a target device, send a beamforming request to the target device via a low-frequency band communication module, and if receiving an acknowledgement response sent by the target device via the low-frequency band communication module and learning that there is a non-target device performing high-speed data communication in the same frequency band with the high-speed data communication initiated by the millimeter-wave communication device, configure a transmitting power that is less than a default power to perform the beam scanning via the millimeter-wave communication module.

The control module is further configured to, in the beam scanning process, if learning that the beam scanning interferes with the high-speed data communication which is being performed by the non-target device in the same frequency band within the beam scanning range via the low-frequency band communication module, reduce the current transmitting power to perform the beam scanning.

The control module is further configured to, after reducing the current transmitting power, judge whether the reduced transmitting power is less than minimum transmitting power, and if the reduced transmitting power is less than the minimum transmitting power, pause for a predetermined time period, and after the pause is finished, use the minimum transmitting power to perform the beam scanning; otherwise, use the reduced transmitting power to perform the beam scanning.

The control module is specifically configured to, after receiving the first alarm message via the low-frequency band communication module, learn that there is a non-target device performing the high-speed data communication in the same frequency band with the high-speed data communication initiated by the millimeter-wave communication device, wherein, the first alarm message is sent via the low-frequency band communication module when the non-target device has received the beamforming request and if the high-speed data communication in the same frequency band with the high-speed data communication initiated by the millimeter-wave communication device is being performed.

The control module is specifically configured to, after receiving the second alarm message via the low-frequency band communicate module, learn that the beam scanning interferes with the high-speed data communication which is being performed by the non-target device in the same frequency band within the beam scanning range, wherein the second alarm message is sent via the low-frequency band communication module when the non-target device that is performing the high-speed data communication in the same frequency band within the beam scanning range detects that the power of the received interference signal is higher than the predetermined power threshold value.

The low-frequency band communication module is a Wireless Fidelity (Wi-Fi) module, and the millimeter-wave communication module is a 60 GHz millimeter-wave communication module.

The working frequency band of the 60 GHz millimeter-wave communication module is 60 GHz; the working frequency band of the Wi-Fi module is 2.4 GHz and/or 5 GHz, the 60 GHz millimeter-wave communication module and the Wi-Fi module have separate RF links and antennas, and the two modules can work independently or simultaneously.

The 60 GHz millimeter-wave communication module and the Wi-Fi module have a unified design MAC layer, which can perform data exchange and scheduling process. The 60 GHz millimeter-wave communication module and the Wi-Fi can cooperate with each other to achieve the aforementioned beamforming process.

Because the frequency difference between 60 GHz and 2.4 GHz/5 GHz is very big, while the radio frequency processing unit and the antenna rely strongly on the working frequency, the 60 GHz millimeter-wave communication module and the Wi-Fi module have their own RF links and antennas. The data transmission rate in the physical layer (PHY layer) of the 60 GHz millimeter-wave communication module is much higher than that of the 2.4/5 GHz Wi-Fi module, it is difficult for the PHY layer of the Wi-Fi module to implement such high-speed data rate processing, therefore the 60 GHz millimeter-wave communication module and the Wi-Fi module have separate PHY layers. On the MAC layer level, in terms of functionality, the MAC function of the MAC layer of the 60 GHz millimeter-wave communication module is similar to the MAC function of the Wi-Fi module, and the two can share one MAC layer.

Those ordinarily skilled in the art can understand that all or some of steps of the abovementioned method may be completed by the programs instructing the relevant hardware, and the programs may be stored in a computer-readable storage medium, such as a read only memory, magnetic or optical disk. Alternatively, all or a part of the steps of the abovementioned embodiments may also be implemented by using one or more integrated circuits. Accordingly, each module/unit in the abovementioned embodiments may be realized in a form of hardware, or in a form of software function modules. The present application is not limited to any specific form of hardware and software combinations.

The above description is only preferred embodiments of the present application and is not used to restrict the protection scope of the present application. For a person skilled in the art, the present application may have a variety of modifications and changes. Any changes, equivalent replacements and improvements made within the spirit and principle of the present application should be included within the protection scope of the present application.

INDUSTRIAL APPLICABILITY

The embodiments of the present document use a low-frequency band communication module to provide control signaling connection and beam scanning initialization information for the beamforming, and with the support of the low-frequency band communication module, it can easily complete the beamforming and directional transmission, and reduce interference with existing transmission links, thus enabling the spatial multiplexing transmission.

What is claimed is:

1. A millimeter-wave communication spatial multiplexing transmission method, comprising:
   a millimeter-wave communication device initiating high-speed data communication with a target device, sending a beamforming request to the target device via a low-frequency band communication module, and if the millimeter-wave communication device has received an acknowledgment response sent by the target device via the low-frequency band communication module and learns that there is a non-target device performing high-speed data communication in a same frequency band with the high-speed data communication initiated by the millimeter-wave communication device, the millimeter-wave communication device configuring transmitting power which is less than default power to perform beam scanning.

2. The method of claim 1, wherein, the method further comprises:
   in a process of the millimeter-wave communication device performing the beam scanning, if the millimeter-wave communication device learns that the beam scanning interferes with the high-speed data communication which is being performed by the non-target device in the same frequency band within a beam scanning range via the low-frequency band communication module, the millimeter-wave communication device reducing current transmitting power to perform the beam scanning.

3. The method of claim 2, wherein, the method further comprises:
   after reducing the current transmitting power, the millimeter-wave communication device also judging whether the reduced transmitting power is less than minimum transmitting power, and if the reduced transmitting power is less than the minimum transmitting power, pausing for a predetermined time period, and after the pause is finished, using the minimum transmitting power to perform the beam scanning; otherwise, using the reduced transmitting power to perform the beam scanning.

4. The method of claim 2, wherein,
   in the process of the millimeter-wave communication device performing the beam scanning, if the non-target device that is performing the high-speed data communication in the same frequency band within the beam scanning range detects that power of a received interference signal is higher than a predetermined power threshold value, the non-target device sends a second alarm message to the millimeter-wave communication device via the low-frequency band communication module;
   the millimeter-wave communication device learning that the beam scanning interferes with the high-speed data communication which is being performed by the non-target device in the same frequency band within a beam scanning range via the low-frequency band communication module, comprises: after receiving the second alarm message via the low frequency band communicate module, the millimeter wave communication device learning that the beam scanning interferes with the high-speed data communication which is being performed by the non-target device in the same frequency band within the beam scanning range.

5. The method of claim 1, wherein,
   after the millimeter-wave communication device sends the beamforming request to the target device via the low-frequency band communication module, if the non-target device has received the beamforming request and is performing the high-speed data communication in the same frequency band with the high-speed data communication initiated by the millimeter-wave communication device, the non-target device sends a first alarm message to the millimeter-wave communication module via the low-frequency band communication module, and informs the millimeter-wave communication device that there is a non-target device performing the high-speed data communication in the same frequency band within the beam scanning range;
   the millimeter-wave communication device learning that there is a non-target device performing high-speed data communication in a same frequency band with the high-speed data communication initiated by the millimeter-wave communication device, comprises: after receiving the first alarm message via the low-frequency band communication module, the millimeter-wave communication device learning that there is a non-target device performing the high-speed data communication in the same frequency band with the high-speed data communication initiated by the millimeter-wave communication device.

6. The method of claim 1, wherein, the low-frequency band communication module is a Wireless Fidelity (Wi-Fi) module, and the high-speed data communication initiated by the target device is 60 GHz high-speed data communication.

7. A millimeter-wave communication device, comprising:
   a low-frequency band communication module, a millimeter-wave communication module and a control module, wherein:
   the control module is configured to: initiate high-speed data communication with a target device, send a beamforming request to the target device via the low-frequency band communication module, and if an acknowledgement response sent by the target device has been received via the low-frequency band communication module and that there is a non-target device performing high-speed data communication in a same frequency band with the high-speed data communication initiated by the millimeter-wave communication device is learned, configure transmitting power which is less than default power to perform beam scanning via the millimeter-wave communication module.

8. The millimeter-wave communication device of claim 7, wherein,
the control module is further configured to, in a process of performing the beam scanning, if that the beam scanning interferes with the high-speed data communication which is being performed by the non-target device in the same frequency band within a beam scanning range via the low-frequency band communication module is learned, reduce current transmitting power to perform the beam scanning.

9. The millimeter-wave communication device of claim 8, wherein,
the control module is further configured to, after reducing the current transmitting power, judge whether the reduced transmitting power is less than a minimum transmitting power, and if the reduced transmitting power is less than the minimum transmitting power, pause for a predetermined time period, and after the pause is finished, use the minimum transmitting power to perform the beam scanning; otherwise, use the reduced transmitting power to perform the beam scanning.

10. The millimeter-wave communication device of claim 8, wherein,
the control module is configured to: after receiving a second alarm message via the low frequency band communicate module, learn that the beam scanning interferes with the high-speed data communication which is being performed by the non-target device in the same frequency band within the beam scanning range, wherein, the second alarm message is sent via the low-frequency band communication module in the process of performing the beam scanning, when the non-target device that is performing the high-speed data communication in the same frequency band within the beam scanning range detects that power of a received interference signal is higher than a predetermined power threshold value.

11. The millimeter-wave communication device of claim 7, wherein,
the control module is configured to, after receiving a first alarm message via the low-frequency band communication module, learn that there is a non-target device performing the high-speed data communication in the same frequency band with the high-speed data communication initiated by the millimeter-wave communication device, wherein, the first alarm message is sent via the low-frequency band communication module when the non-target device has received the beamforming request and if the high-speed data communication in the same frequency band with the high-speed data communication initiated by the millimeter-wave communication device is being performed.

12. The millimeter-wave communication device of claim 7, wherein,
the low-frequency band communication module is a Wireless Fidelity (Wi-Fi) module, and the millimeter-wave communication module is a 60 GHz millimeter-wave communication module.

* * * * *